Aug. 9, 1932.
C. E. VAN AUKEN
1,870,936
SYSTEM FOR INDICATING LIQUID LEVELS
Filed Oct. 30, 1919      2 Sheets-Sheet 2
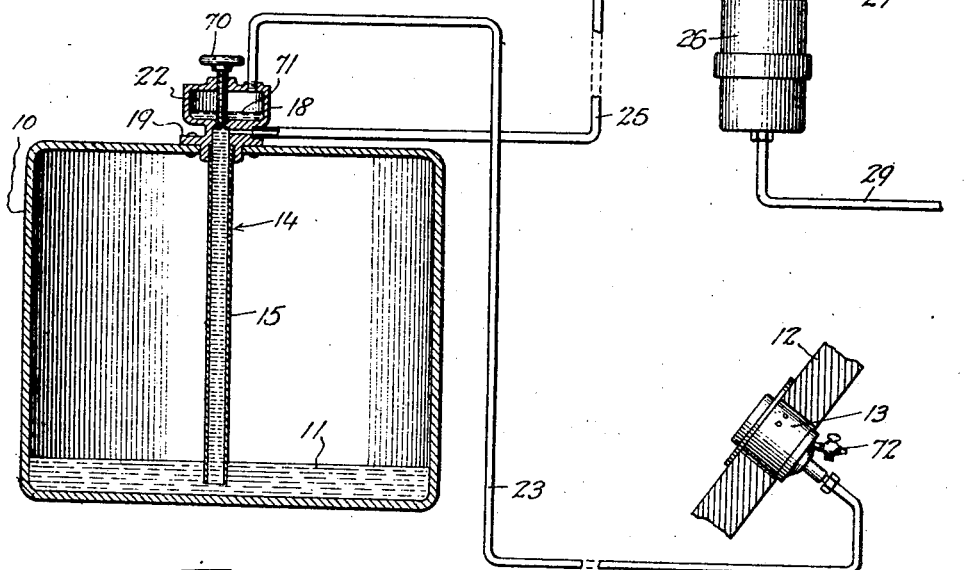
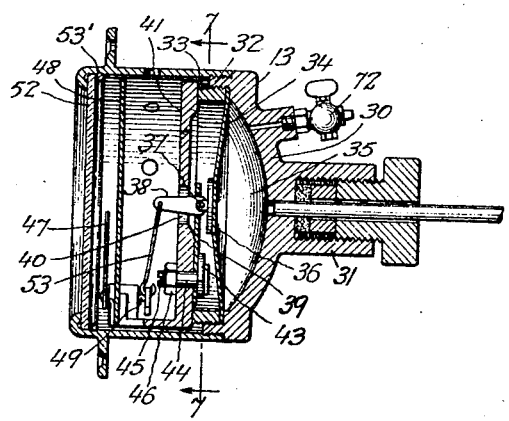
Inventor
Clarence E. Van Auken
Jones, Bain & Hinkle
Attys.

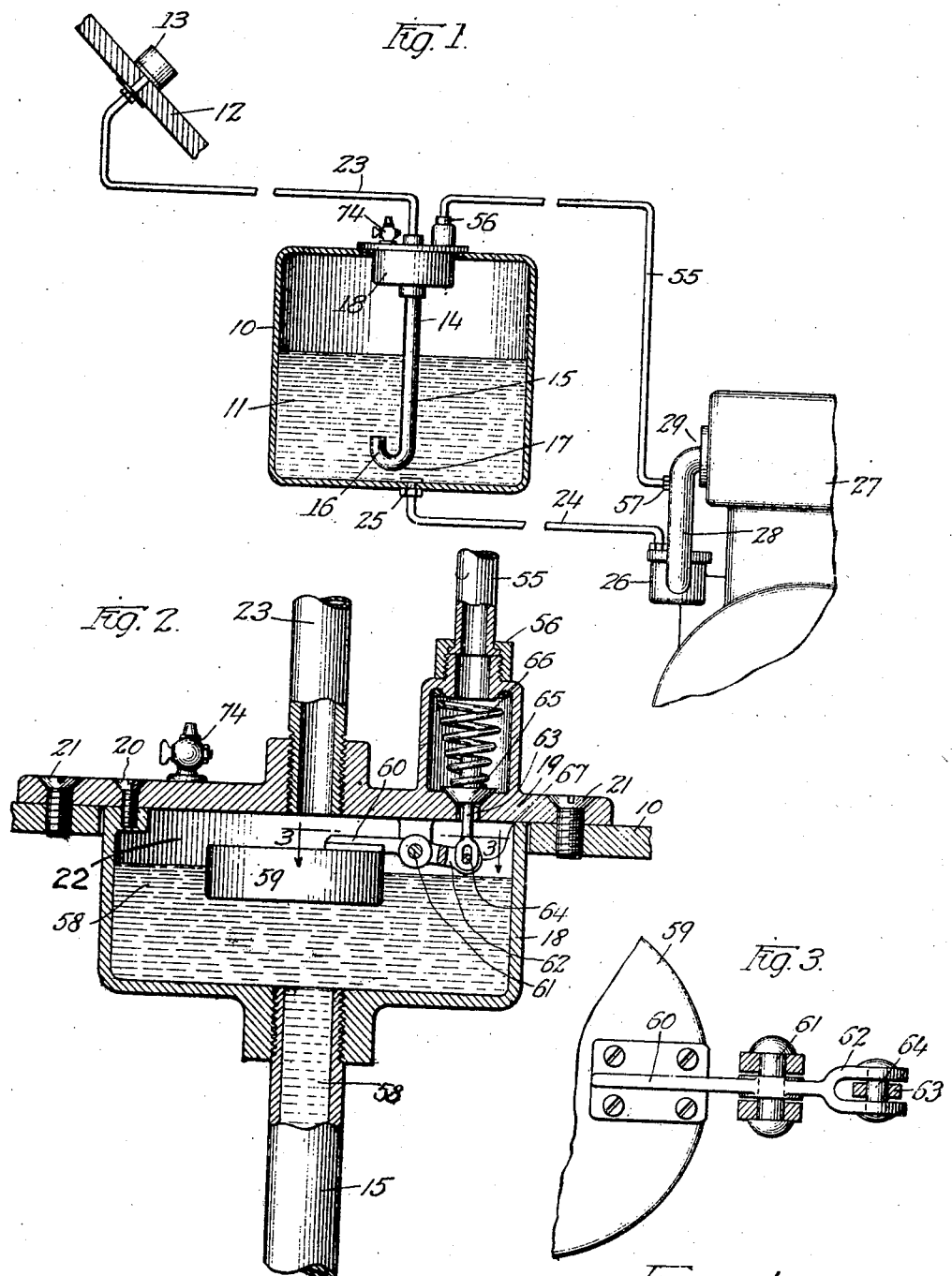

Patented Aug. 9, 1932

1,870,936

UNITED STATES PATENT OFFICE

CLARENCE E. VAN AUKEN, OF CHICAGO, ILLINOIS; JOSEPH PURMORT, ADMINISTRATOR OF THE ESTATE OF SAID CLARENCE E. VAN AUKEN, DECEASED, ASSIGNOR TO CORA F. VAN AUKEN

SYSTEM FOR INDICATING LIQUID LEVELS

Application filed October 30, 1919. Serial No. 334,536.

The invention relates to improvements in systems and apparatus for indicating liquid levels or contents in tanks or other receptacles at a point remote from the liquid reservoir or container.

One of the objects of the invention is to provide improved means for indicating at remote points, the liquid level, or hydrostatic head in receptacles, by a system and apparatus which is unaffected by the relative altitude of the liquid container and the indicator and which is substantially immune from the effect due to change of temperature and atmospheric pressure.

Another object is to provide, in a system of the character described, a conduit having therein a medium under sub-atmospheric pressure, or abnormal attenuation for affecting the indicator relatively to the variation of depth or hydraulic head of the liquid in the container.

Another object is to provide a system for the purpose described, in connection with an internal combustion engine, wherein the suction effect produced by the inspiration stroke of the engine is utilized to cause air rarefaction in the conduit between the liquid receptacle and the indicator in systems where the liquid must be lifted for use in the engine.

Another object is to provide a system in which rarefaction of air in the conduit is produced by movement of the liquid therefrom, as by the effect of gravity when the point of utilization is below the altitude of the container enclosing the liquid to be used.

Other, further and more specific objects of the invention will become readily apparent, to persons skilled in the art, from a consideration of the following description when taken in conjunction with the drawings, wherein:—

Fig. 1 shows the system in which the movement of the liquid, by gravity, from the container is indicated upon a dial located at a remote point. It furthermore shows an automatic means for maintaining the desired attenuation in the conduit between the indicator and the receptacle.

Fig. 2 is an enlarged cross sectional view of that portion of the device located within, or adjacent to the receptacle.

Fig. 3 is an enlarged fragmentary section taken on line 3—3 of Fig. 2.

Fig. 4 is a modified form of the system.

Fig. 5 is a central sectional view of the indicator.

Fig. 6 is a front view of the indicator showing the index and the dial, over which it is moved.

Fig. 7 is a transverse section taken on line 7—7 of Fig. 5.

In all the views the same reference characters are employed to indicate similar parts.

In automobiles it is desirous to have an indicator on the instrument board of the vehicle, convenient to the driver, which instantly shows the quantity, or relative quantity, of fuel contained in the tank or fuel reservoir, which is usually supported at a remote point in the rear of the vehicle. While my device is admirably adapted for this purpose it will be apparent that it may be used for other purposes in different environments and that further modifications may be made therein within the scope of the appended claims.

In the drawings 10 represents a closed fuel tank, receptacle or reservoir containing liquid fuel 11. As the fuel is withdrawn to meet the demand of the engine, a sub-atmospheric pressure is created in the reservoir, the purpose of which will appear later on. 12 represents a support such as the instrument board of an automobile and 13 the sub-atmospheric indicator for visually showing the quantity of the liquid within the liquid receptacle or tank. 14 is an instrument or device, a part of the conduit, located adjacent the tank 10, or therein, consisting of a pipe or tube 15 which in some instances may be curved upwardly, as at 16, to provide a liquid seal in the curved part 17 of the pipe. To the upper end of the pipe is secured a casing 18 provided with a top or cover 19 secured thereto by screws 20 and secured to the tank 10, as by screws 21. In Fig. 1 the casing 18 is shown within the tank while in Fig. 4 the casing is located just above the tank. Either form of device and location thereof may be used, in contemplation of my invention.

The chamber 22 in the casing 18 is in communication with the instrument 13 by a conduit or pipe 23. In Fig. 1 a pipe 24 is connected to the bottom of the tank 10, as at 25, and to the usual carburetor 26 of an engine 27. The carburetor 26 is connected by the intake manifold 28 to the engine, as at 29. In Fig. 1, the tank 10 is located above the carburetor and the liquid fuel 11 will flow thru the pipe 24 to the carburetor by the effect of gravity. In Fig. 4, a pipe 25 is shown to be connected to the upper part of the structure 14 between the tube 15 and the casing 18 and to the vacuum fuel tank 26 and this tank is connected by a pipe 27, as usual, to the intake manifold 28 of an engine, while the pipe 29 of the tank 26 is connected to the carburetor in the same manner as the pipe 24 is shown to be connected to it, in Fig. 1.

The indicator 13 consists of a casing part 30 having hub 31 internally threaded and an internally and externally threaded flange 32. The ring 33 is threaded in the flange 32 and bears upon the periphery of the flexible imperforate diaphragm 34. The diaphragm thus hermetically seals the chamber 35, within the casing 30. The center of the diaphragm 34 carries a disc 36 to which is secured ears 37 on which is pivoted a stud or an arm 38, which is fixed to a flexible blade spring 39, and which extends outwardly thru a perforation 40 in the frame 41. The frame 41 is connected to the ring 33 in a suitable manner. The spring blade 39 is secured to the frame 41 by a rotatable cam 43, having a shank 44 that extends thru the frame 41 nd is adapted to be rotated by a slotted end 5 and held in adjusted position by a set nut 6. The face of the cam is of such character that when rotated it changes the effective length and strength of the spring blade 39.

An index 47, adapted to be moved over the dial 48, is secured to a shaft 49. The shaft carries a counter-weight 50 which holds the index 47 at the point 20 on the graduated dial when the reservoir is full. A glass cover plate 52 is secured in the front of the casing part 53' by suitable means for enclosing the mechanism of the instrument.

The counter-weight 50 is connected to the projecting stud 38 by a link 53, so that when the stud 38 is lifted, by operation of the spring 39 and the diaphragm 34, the shaft 49 is rotated and hence the index 47 will be made to move over the scale 54 of the instrument 13.

When the diaphragm 34 is moved to the right, viewed in Fig. 5, it flexes the spring blade 39 at the point where it contacts the holding cam 43 (see Fig. 7) and the blade moving outwardly from this fulcrum will cause the outer end of the arm 38 to be raised, which action will move the index 47.

The positions of the parts of the instrument, as shown in Fig. 5, are that which they occupy when the reservoir is full and the index points to 20 on the dial.

To prime the system to put it in condition for its intended use, the air cocks 72 or 74, one or both are first opened to permit the air to be displaced by the liquid in the system, to escape therefrom when the tank is being filled. The tank is now filled with liquid. The tube 15 will be filled to the same liquid level as that in the tank. The air-cock is now closed and the index will now register at 20 indicating that the tank is full. As the liquid is drawn out of the tank, or as the hydrostatic head is lowered, the suspended liquid in the system tending to follow the downward course of the liquid in the tank thereby creates a partial vacuum in the system, whereupon the predominating atmospheric pressure pushes the diaphragm 34 inwardly against the resilient resistance of the calibrated spring 39, raising the stud and moving the index towards the zero point as hereinbefore pointed out. When the liquid in tank 10 is about exhausted the difference in atmospheric pressure and the sub-atmospheric pressure within the system will cause the index to rest at the zero point.

Now assuming that the device, shown in Fig. 1, with the conduit 55, connected to the casing 18, as at 56, and to the intake manifold 28 of the engine 27, as at 57, be closed at 56, to shut off communication between the manifold 28 and the casing 18, under which conditions the float 59 and valve 65 would not be required. Now if the tank 10 be filled with liquid 11, the liquid 58 in the casing 18 will be at substantially the same level as the liquid in the tank and the device is ready for operation. As the liquid level in the tank 10 becomes lowered, as a result of its consumption by the engine, the column of liquid 58 in the tube 15 and the casing 18, will move downwardly and expand or attenuate the air in the tube or conduit 23, thereby causing the outside atmosphere to press the diaphragm 34 inwardly and move the index needle or pointer over the scale 54 of the instrument, and the index will be moved correspondingly over the instrument relatively to the attenuation of atmospheric air within the conduit 23 and the chamber 35 of the instrument. The lower the liquid level becomes, the greater will be the difference in pressure. The trap 17, between the pipe 15 and the end 16 of the instrument 14 will prevent air from entering the conduit 23 when the liquid 11 in the tank 10 is substantially exhausted. Of course the liquid 58 in the casing 18 will not move downwardly to the same extent that the liquid 11 in the tank 10 is moved as it is being drawn from the tank, on account of the attenuation of the air and vacuum effect in the air tight conduit 23 and chamber 35 of the instrument, but it will be moved substantially proportional as the static head in the tank 10 is lowered, thereby producing greater or less attenuation.

To provide for any possible leak of air into the conduit 23 and the connecting devices to disturb the partial vacuum, a float 59 is placed in the casing 18 and is connected to a lever 60, which is pivoted, as at 61. The free end 62 of the lever is pivoted to a valve stem 63, as at 64; the valve being yieldingly held closed by a spring 66. Now when the liquid level of the liquid 58 in the casing 18 descends too low, as a result of accidental leak of air in the conduit 23, the partial vacuum may be re-established by operation of the float 58 which opens the valve 65 communicating with the pipe 55 that is connected to the intake manifold 28 of the engine, whereby the suction effect of the engine will attenuate the air in the casing 18, the instrument 13 and the connecting conduit 23, re-establishing the rarefied condition, thereby causing the liquid 58 to rise in the casing 18 and elevate the float 59 which again closes the valve 55. Owing to the slot 67 in the lower end of the stem 63, the float 59 will have a certain range of movement in which the valve 65 is unaffected, and this movement is sufficient to permit the indicating instrument to operate thruout the entire range of change of static head in the tank 10.

In the modification shown in Fig. 4, the pipe 25 is connected to the instrument 14 between the tube 15 and the casing 18 and an adjustable needle valve 70 will close communication between the tube 15 and the casing 18, to a greater or less extent, so that the liquid 71 drawn into the casing 18 by the effect of the suction of the engine thru the pipe 25 will be moved into the casing 18 more slowly from the tank 10, owing to the retarding effect of the construction produced by the operation of the adjusting screw and valve 70. This prevents the violent fluctuation of liquid level in the tank, due to a rough uneven roadway from correspondingly moving the index. The gradual rise and fall of the liquid level, of the liquid 71 in the casing 18, is substantially proportional to the variation in the static head of the liquid 11 in the tank 10, so that the attenuation of the air within the conduit 23 and the casing to which it is connected, is relative to the quantity of liquid or the liquid level in the tank 10.

A stop cock 72 in the instrument 13 is also a means by which air may be drawn from the casing and the connecting conduit 23 in starting the operation of the device, instead of proceeding in the manner heretofore described, or by which air may be forced into the chambers enclosed by the respective casings in the conduit 23 to blow out any liquid that might perchance be entrained in the conduit 23, and a similar stop cock 74 is placed in the casing 18 so as to provide a free passage way thru the conduits in the respective casings, when the tube 25 is to be cleared of any liquid which might be trapped therein.

While I have herein shown a single embodiment of my invention for the purpose of clear disclosure, with a single modification to show one variation of form which the said invention may take, it will be manifest that there are other changes in the disposition and configuration of the parts that may be made within the scope of the appended claims.

Having described my invention, what I claim is:—

1. A system of the character described for use with an internal combustion engine, said system having in combinative association a closed liquid reservoir under sub-atmospheric pressure, from which liquid may be drawn, a sub-atmospheric pressure indicator and a sub-atmospheric conduit connecting the indicator and reservoir, whereby the air in the reservoir, conduit and indicator is reduced to an attenuated state relatively to the change of hydraulic head in the reservoir, and means operable by the inspiration stroke of the engine for automatically maintaining the air at the required degree of attenuation to effectively operate the indicator.

2. A system of the character described for use in connection with an internal combustion engine, said system having in combinative association a closed liquid reservoir under sub-atmospheric pressure from which liquid may be drawn, a sub-atmospheric pressure indicator, a connecting conduit extending from a point near the bottom of the reservoir to the indicator, and means operable by the suction action of the engine for attenuating the air in the conduit so that the liquid rises and is maintained at a fixed level therein, the resulting variation of sub-atmospheric pressure in the conduit serving to energize the indicator to give visual readings of the changing liquid level in the reservoir as the liquid is withdrawn therefrom.

3. A system of the character described having in combination a closed liquid reservoir from which liquid may be withdrawn, a sub-atmospheric pressure indicator, and a conduit connecting said indicator to the reservoir and extending to a point near the bottom of the reservoir, said conduit being enlarged at a point adjacent to the reservoir to provide a chamber of relatively large capacity with respect to the conduit, a suction connection communicating with said chamber, and means within the chamber automatically controlling said suction connection.

4. A system of the character described having in combinative association a closed reservoir from which liquid may be withdrawn, a sub-atmospheric pressure-responsive indicator having a chamber closed by a diaphragm, a conduit extending from said chamber to a point near the bottom of the reservoir, an air vent for the conduit permitting the liquid to rise therein when the reservoir is being filled, and means for creating sub-normal pressure in the conduit to maintain the liquid at a fixed level therein and actuate the diaphragm of the indicator causing the indicator to give readings comparable to the quantity of liquid withdrawn from the reservoir.

5. A gasolene gage for the supply tank of automobiles including a pressure controlled indicator, a casing extending into the supply tank but terminating above the normal level of the liquid therein, means connected thereto and affording open communication between the casing and the liquid in said tank at the minimum level to be gaged, a tube providing communication between the upper end of the casing and said indicator, a pipe leading from said upper end of the casing for establishing communication with the suction of an engine, a float arranged in said casing, and means adapted to be actuated by the float upon accumulation of a predetermined amount of liquid in said casing to close communication between the casing and engine suction.

6. A gasolene gage for the supply tank of automobiles including a pressure controlled indicator, a casing arranged above the normal level of the liquid in the tank, means connected thereto and affording open communication between the casing and the liquid in the tank at the minimum level to be gaged, a tube providing communication between the upper end portion of the casing and said indicator, a pipe leading from said portion of the casing for establishing communication with the suction of an engine, a float arranged in said casing and means adapted to be actuated by the float upon accumulation of a predetermined amount of liquid in said casing to close communication between the casing and engine suction.

7. In apparatus of the class described, a liquid holding tank, means forming an inclosed chamber, a connection for creating a partial vacuum in said chamber, means affording communication between said chamber and the liquid in said tank at the minimum level to be gaged whereby the liquid may be drawn into said chamber by the vacuum existing therein, a valve for regulating the degree of vacuum in said chamber, and means responsive to the rise of liquid in said chamber for controlling said valve.

8. A liquid gage including a tank, a float chamber above the liquid level in the tank, a liquid conduit having its lower end submerged in the liquid in the tank and its other end in communication with the float chamber and providing a constant communication therebetween, a vacuum connection whereby a condition of low pressure may be set up in the chamber, causing flow of liquid from the tank through the conduit and into the float chamber, a float in the chamber, means actuated in accordance with the position of the float for regulating pressure within the float chamber, and means controlled by the float chamber pressure for indicating the liquid level in the tank, substantially as described.

9. An apparatus for indicating the height of liquid in a tank, comprising the combination, with a tank adapted to contain liquid, of a chamber smaller in horizontal area than the tank and extending upward and downward throughout the range of levels to be indicated, said chamber having a liquid connection with said tank at a low level relatively to said range of levels, a vacuum connection whereby a condition of low pressure may be set up in the chamber, means controlled by rise of liquid in said chamber for limiting the degree of vacuum possible to be obtained therein, an indicator operable by difference between internal and external fluid pressures, and means whereby said indicator is coupled with that part of said chamber in which a vacuum is thus produced.

In testimony whereof I hereunto subscribe my name.

CLARENCE E. VAN AUKEN.